(12) United States Patent
Schreurs

(10) Patent No.: US 8,943,804 B2
(45) Date of Patent: Feb. 3, 2015

(54) COMPRESSION-IGNITION ENGINE WITH EXHAUST SYSTEM

(75) Inventor: Bart Hubert Schreurs, Arlon (BE)

(73) Assignee: Delphi International Operations Luxembourg, S.A.R.L., Luxembourg (LU)

( * ) Notice: Subject to any disclaimer, the term of this patent is extended or adjusted under 35 U.S.C. 154(b) by 308 days.

(21) Appl. No.: 13/521,234

(22) PCT Filed: Jan. 13, 2011

(86) PCT No.: PCT/EP2011/050400
§ 371 (c)(1),
(2), (4) Date: Jul. 10, 2012

(87) PCT Pub. No.: WO2011/086129
PCT Pub. Date: Jul. 21, 2011

(65) Prior Publication Data
US 2013/0006504 A1 Jan. 3, 2013

(30) Foreign Application Priority Data

Jan. 13, 2010 (EP) ..................................... 10150682

(51) Int. Cl.
*F01N 3/00* (2006.01)
*F01N 3/20* (2006.01)
(Continued)

(52) U.S. Cl.
CPC .............. *F01N 3/2066* (2013.01); *F01N 3/035* (2013.01); *F01N 3/101* (2013.01); *F01N 3/2882* (2013.01); *F01N 13/009* (2013.01); *F01N 3/021* (2013.01);
(Continued)

(58) Field of Classification Search
CPC ...... F01N 3/2066; F01N 3/0842; F01N 3/035; F01N 2610/03; F01N 2610/02; F01N 13/02; F01N 9/002; F22D 41/029
USPC ........... 60/273, 274, 285, 286, 278, 295, 301, 60/300
See application file for complete search history.

(56) References Cited

U.S. PATENT DOCUMENTS 5,782,087 A * 7/1998 Kinugasa et al. ............... 60/276
2009/0133383 A1 5/2009 Shost
(Continued)

FOREIGN PATENT DOCUMENTS

DE  10 2005 022 420    5/2005
WO  2009/134831       11/2009

OTHER PUBLICATIONS

International Search Report dated Apr. 21, 2011.

*Primary Examiner* — Thomas Denion
*Assistant Examiner* — Patrick Maines
(74) *Attorney, Agent, or Firm* — Mark H. Svoboda

(57) ABSTRACT

A compression-ignition engine (10) comprises an exhaust system (16) with an exhaust gas after-treatment assembly, the after-treatment assembly comprising a three-way catalyst device (30) and an SCR device (34), the three-way catalyst device being arranged upstream the SCR device in close-coupled position with respect to the engine. An engine control unit (47) is provided for controlling operation of the engine. The engine control unit is configured to monitor the temperature of the SCR device and to control the engine to change over from an operation with a lean air/fuel mixture to an operation with a stoichiometric or a rich air/fuel mixture in response to the temperature of the SCR device dropping below a temperature threshold.

14 Claims, 2 Drawing Sheets

(51) Int. Cl.
  F01N 3/035  (2006.01)
  F01N 3/10  (2006.01)
  F01N 3/28  (2006.01)
  F01N 13/00  (2010.01)
  F01N 3/021  (2006.01)
  F02B 29/04  (2006.01)
  F02M 25/07  (2006.01)

(52) U.S. Cl.
  CPC ......... *F01N 2610/02* (2013.01); *F02B 29/0406* (2013.01); *F02M 29/0406* (2013.01); *F02M 25/0707* (2013.01); *F02M 25/0727* (2013.01); *Y02T 10/22* (2013.01); *Y02T 10/24* (2013.01)
  USPC .................. 60/285; 60/286; 60/295; 60/278; 60/301

(56) References Cited

U.S. PATENT DOCUMENTS

| | | | |
|---|---|---|---|
| 2009/0260349 A1* | 10/2009 | Gandhi et al. | 60/286 |
| 2009/0276439 A1 | 11/2009 | Rosenblatt et al. | |
| 2009/0276547 A1 | 11/2009 | Rosenblatt et al. | |
| 2010/0107605 A1* | 5/2010 | Brinkman et al. | 60/274 |
| 2011/0138783 A1* | 6/2011 | Sakurai | 60/276 |
| 2011/0265455 A1* | 11/2011 | Hirota et al. | 60/285 |
| 2013/0091826 A1* | 4/2013 | Gonze et al. | 60/274 |
| 2013/0318949 A1* | 12/2013 | Matsunaga et al. | 60/286 |
| 2014/0041367 A1* | 2/2014 | Balthes et al. | 60/274 |

* cited by examiner

COMPRESSION-IGNITION ENGINE WITH EXHAUST SYSTEM

TECHNICAL FIELD

The present invention relates generally to exhaust gas treatment for compression ignition engine for vehicles.

BACKGROUND ART

Due to chemical reactions and the incomplete combustion of fuel in the combustion chamber of an internal combustion engine, the gases emitted from the exhaust system of the engine may contain a number of hazardous substances, which can lead to air pollution problems that may be detrimental to health and the environment. The main pollutants of concern in the gases emitted from the exhaust system of an internal combustion engine are hydrocarbons (HC), carbon monoxide (CO), oxides of nitrogen ($NO_x$), and particulates (i.e. soot).

An ever-increasing number of vehicles has resulted in increasing air pollution, particularly in urban areas. Therefore, a series of ever-stricter emission standards have been imposed to mitigate these pollution problems.

In order to reduce the emissions of HC, CO, and $NO_x$ from gasoline-fuelled spark ignition engined vehicles, three-way catalytic converters have been widely implemented, such three-way catalytic devices incorporating a reduction catalyst, to reduce $NO_x$ to $N_2$ and $O_2$, and an oxidation catalyst, to oxidize CO to $CO_2$ and HC to $H_2O$ and $CO_2$. However, for optimal operation of a three-way catalyst, the vehicle engine has to be controlled to operate stoichiometrically, i.e. so that the amount of oxygen supplied to the combustion chamber corresponds to that required for complete combustion of the amount of fuel supplied. For gasoline, this corresponds to an air/fuel mass ratio of 14.7 parts air to 1 part fuel.

When there is more air, and hence oxygen, than required, then the system is said to be running lean, and the system is in oxidizing condition. In that case, the converter's two oxidizing reactions (oxidation of CO and HC) are favoured, at the expense of the reducing reaction. When there is excessive fuel, then the engine is running rich. The reduction of NO, is favoured, at the expense of CO and HC oxidation. If an engine could be held at the strict stoichiometric point for the fuel used, it is theoretically possible to reach 100% conversion efficiencies.

Unlike spark ignition gasoline-fuelled engines, diesel-fuelled compression-ignition engines are normally operated under lean conditions with excess air ($\lambda>1$). Thus, while an oxidation catalyst can be used to oxidize CO to $CO_2$ and HC to $H_2O$ and $CO_2$, excess oxygen in the exhaust gas due to the lean burn conditions normally prevents reduction of $NO_x$ to $N_2$ and $O_2$.

Selective catalytic reduction (SCR) can be used to reduce the $NO_x$, wherein a gaseous or liquid reductant (most commonly ammonia or urea) is added to the exhaust gas stream and is adsorbed onto a catalyst. The reductant reacts with $NO_x$ in the exhaust gas to form $H_2O$ (water vapour) and $N_2$ (nitrogen gas). However, SCR is very sensitive to fuel contaminants, operates in a limited (high) temperature window.

In diesel engine applications requiring oxidation of CO and HC as well as high $NO_x$ conversion, one currently uses a combination of a diesel oxidation catalyst (DOC) device, diesel particulate filter (DPF) and an SCR device with injection of urea (typically vaporized from aqueous solution, available e.g. as "Diesel Exhaust Fluid" or "AdBlue") or ammonia. This is typically the case for applications on the US emission cycle and for heavy cars.

Once the SCR system reaches his operating temperature, $NO_x$ conversion efficiency higher than 95% is state of the art today.

The SCR catalyst is usually located at quite some distance away from the engine exhaust valves or the turbine-outlet. Typically, the DOC device and the particulate filter are located in a close-coupled position and the SCR catalyst is located underfloor. This is due to the fact that a minimum distance is required between the particulate filter outlet and the SCR catalyst inlet to accommodate the urea injector, the mixer element and some pipe length to allow the mixing of the urea or ammonia with the exhaust gas before the mixture of exhaust gas and urea enters the SCR catalyst.

An SCR catalyst becomes active around 220° C. Due to the long distance in the exhaust line it is, however, difficult to get the SCR system operational very early in the emission cycle.

In the past, one has applied special warm-up strategies in the engine management to bring the SCR catalyst as fast as possible to its operating temperature.

These warm-up strategies have a negative impact on fuel economy, and even with the best warm-up strategies, most applications have difficulties to achieve good $NO_x$ conversion efficiency during phases of heavy acceleration occurring shortly after a cold start or when the motor has not yet reached its temperature range for optimal operation. Tests following the FTP-75 cycle (Federal Test Procedure) have shown that with current state-of-the-art after-treatments systems, as much as about 50% of the total tailpipe $NO_x$ emissions are produced during the heavy accelerations occurring about 200 s after the beginnings of the "cold start phase" and the "hot start phase", respectively.

Document DE 10 2005 022 420 A1 discloses an exhaust system for a Diesel engine with a three-way catalyst and an SCR device. The document suggests running the engine in stoichiometric mode during the warm-up phase. During stoichiometric operation, emissions are treated thanks to the three-way catalyst material.

Technical Problem

It is an object of the present invention to propose an improved approach for reduction of $NO_x$ emissions from a compression-ignition engine. This object is achieved by a compression-ignition engine as claimed in claim 1 or a method as claimed in claim 14.

GENERAL DESCRIPTION OF THE INVENTION

A compression-ignition engine according to the invention comprises an exhaust system with an exhaust gas after-treatment assembly, the after-treatment assembly comprising a three-way catalyst device and an SCR device, the three-way catalyst device being arranged upstream the SCR device in close-coupled position with respect to the engine. An engine control unit is provided for controlling operation of the engine. The engine control unit is configured to monitor the temperature of the SCR device and to control the engine to change over from an operation with a lean air/fuel mixture to an operation with a stoichiometric or a rich air/fuel mixture in response to the temperature of the SCR device dropping below a temperature threshold (e.g. 200° C.). The engine control unit may advantageously be configured to temporarily prevent or delay the change over to the stoichiometric or rich air/fuel mixture if it determines that the engine-out $NO_x$ emissions will remain below a certain threshold, e.g. a legal $NO_x$ emission limit, even if the engine remains in lean combustion mode. The engine control unit may then initiate the change over as soon as it estimates that the $NO_x$ emissions would exceed the preset threshold.

The present invention thus addresses the problem that the SCR device is typically located in a position, which is relatively remote from the engine and which has the drawback that a significant quantity of heat is lost between the engine and the SCR device. Another problem of the remote position is that an important part of the exhaust line must be heated up before the SCR device finally heats up. Another problem arises from the fact that modern Diesel engines are relatively efficient and such engine produces less heat. In certain driving situations, e.g. when the motor is running idle or with low load, it may happen that the heat arriving at the SCR device is no longer sufficient to maintain the temperature thereof above the required temperature threshold. Paradoxically, the achievements in terms of fuel efficiency may thus lead to higher $NO_x$ emissions. By employing a three-way catalyst and changing over from lean mode operation ($\lambda>1$) to stoichiometric ($\lambda=1$) or rich ($\lambda>1$) combustion when the (estimated or measured) SCR device temperature drops below the required minimum temperature, the present invention prevents uncontrolled increase of $NO_x$ emissions in situations where the SCR device is too cold to have good $NO_x$ reduction capability.

Due to its close-coupled position, the three-way catalyst reaches its operating temperature quickly (even without active heat-up strategies) and also maintains a sufficient temperature in low load situations. Therefore, the three-way catalyst can provide good $NO_x$ conversion during acceleration phases occurring shortly after a cold start or after a period during which the SCR device cools down due to an extended low load operation. Good $NO_x$ conversion in the three-way catalyst is obtained by switching the engine to an operation at $\lambda=1$. The total tailpipe $NO_x$ emissions can thus be significantly reduced compared to a conventional exhaust system with an SCR device and a diesel oxidation catalyst. Even though temporary $\lambda=1$ operation may result in slightly worse (instantaneous) fuel efficiency, the overall $CO_2$ emissions (over an entire test cycle) are lower than in conventional systems wherein heat-up strategies are applied to have a faster warm-up of the SCR system or to keep the SCR device at its optimum temperature.

Preferably, the catalyst device comprises a diesel particulate filter to remove diesel particulate matter or soot from the exhaust gas.

The SCR device may comprise a reductant injector, an SCR catalyst and a mixing zone located between the reductant injector and the SCR catalyst for allowing injected reductant to mix with exhaust gas.

Preferably, the SCR device comprises a slip catalyst to prevent release of ammonia.

The SCR device may be arranged in any suitable location in the vehicle. In most cases, however, due to space constraints and to allow for good mixing of the urea or ammonia with the exhaust gases, the SCR device will be arranged in an underfloor position.

Preferably, the engine control unit is also configured to control the engine to operate with a stoichiometric or a rich air/fuel mixture during a warm-up phase of the SCR device after a cold start.

The exhaust system may comprise a temperature sensor operatively coupled with the engine control unit. The temperature sensor could e.g. be located anywhere in the exhaust line, e.g. upstream of the urea or ammonia injector of the SCR device, inside the SCR catalyst material, or downstream of the SCR device. In this case, the engine control unit could directly use the temperature measured by the temperature sensor for deciding upon the combustion mode to use. In case the temperature sensor is not directly arranged in the SCR catalyst material, the engine control unit or a separate temperature estimator would compute the SCR device temperature to be monitored using temperature measurements from the temperature sensor as input parameters of a mathematical model describing thermal properties of the exhaust system. The model may take into account e.g. the thermal capacity of the materials of the exhaust line, the mass flow rate of the exhaust gas, the outside temperature, etc.

According to a preferred embodiment of the invention, the engine control unit is configured to compute the SCR device temperature to be monitored using engine parameters, such as e.g. the quantity of injected fuel, mass air flow, EGR rate, engine efficiency etc. as input parameters of a mathematical model providing the evolution of the temperature of the SCR device as a function of the engine parameters. In this embodiment, no temperature sensor may be needed in the exhaust system. The mathematical model describing the thermal properties of the exhaust system and/or mapping the engine parameters on an SCR device temperature are preferably implemented in software (as program code and stored data) or by a dedicated electronic circuit, such as e.g. an application-specific integrated circuit, a field-programmable gate array, a digital signal processor, or equivalents thereof.

The engine control unit, or a separate temperature estimator operatively connected to the engine control unit, as the case may be, is preferably configured to control operation of the SCR device depending on the temperature of the SCR device. Injection of the gaseous or liquid reductant (e.g. ammonia or urea) is then stopped when the SCR device temperature is too low and switched on when the temperature is high enough.

Preferably, the compression-ignition engine comprises an exhaust gas recirculation device operatively coupled to the engine control unit, in such a way that the engine control unit may control the exhaust gas recirculation device to achieve the stoichiometric or rich air/fuel mixture in the mentioned situations (or to change over to lean combustion).

An aspect of the present invention is concerned with a method of operating a compression-ignition engine comprising an exhaust system with an exhaust gas after-treatment assembly, the after-treatment assembly comprising a three-way catalyst device and an SCR device, and the three-way catalyst device being arranged upstream the SCR device in close-coupled position with respect to the engine. According to this method, the (directly measured or estimated) temperature of the SCR device is monitored and the engine is controlled in such a way as to change over from an operation with a lean air/fuel mixture to an operation with a stoichiometric or a rich air/fuel mixture when the temperature of the SCR device drops below a temperature threshold. Advantageously, the change over to the stoichiometric or rich air/fuel mixture may be made conditional upon that the engine-out $NO_x$ emissions would otherwise increase above a certain threshold, e.g. a legal $NO_x$ emission limit. Thus, in situations where the temperature of the SCR device drops below the temperature threshold but the $NO_x$ emissions are low (typically under very low load conditions, e.g. during a descent), the switching to an engine operation with a stoichiometric or a rich air/fuel mixture is preferably (temporarily) suppressed. The change over may then take place as soon as it is estimated that the $NO_x$ emissions would exceed the corresponding threshold. The combustion mode of the engine is preferably controlled via an EGR device.

BRIEF DESCRIPTION OF THE DRAWINGS

Further details and advantages of the present invention will be apparent from the following detailed description of a not limiting embodiment with reference to the attached drawings, wherein.

DESCRIPTION OF PREFERRED EMBODIMENT

Figure 1:
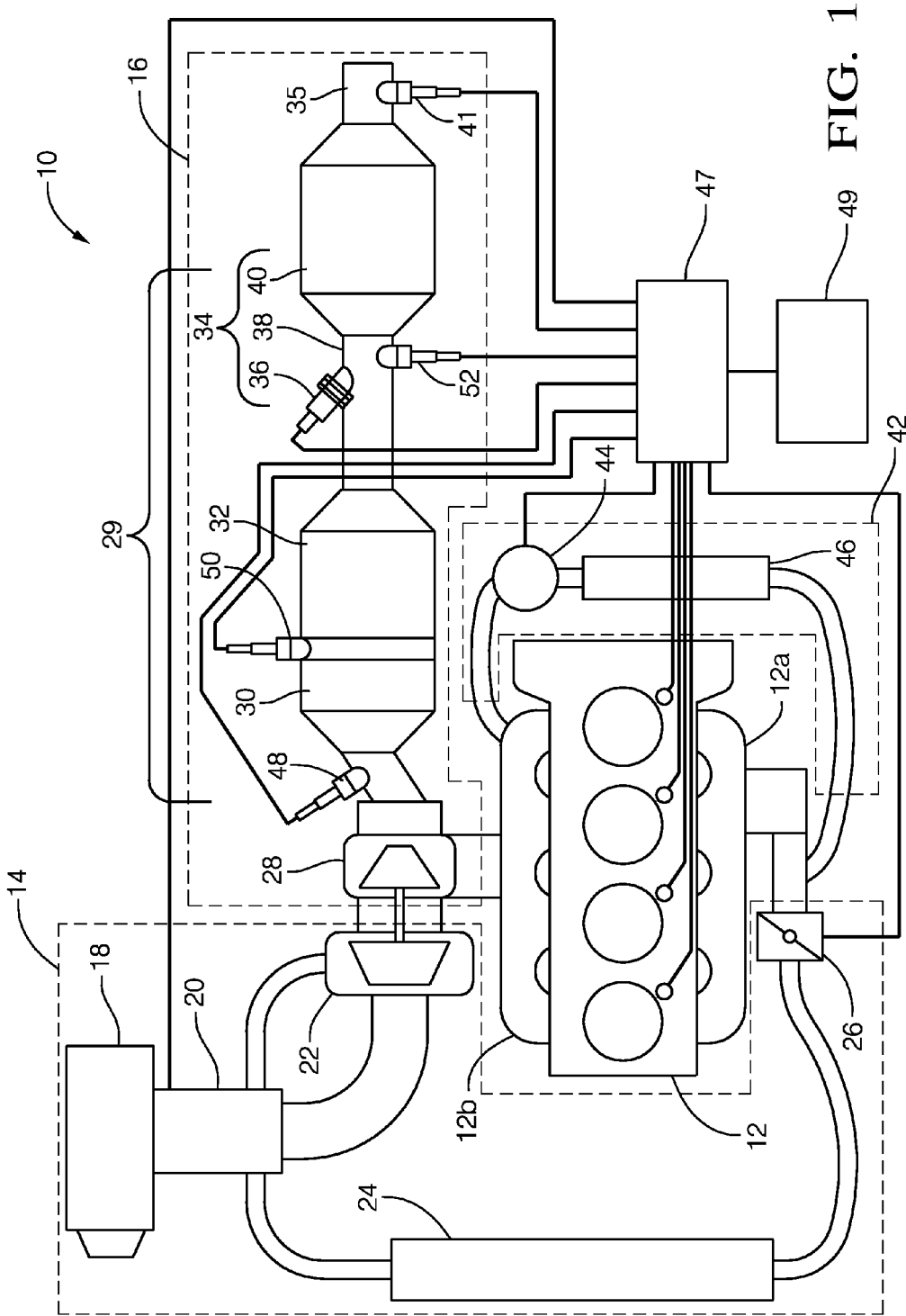
FIG. 1 is a schematic view of a diesel engine equipped with an exhaust system.

Referring to FIG. 1, a diesel compression-ignition engine 10 according to a preferred embodiment of the present invention is shown. The engine 10 comprises an engine block 12 connected up-stream to an air intake passage 14 and downstream to an exhaust system 16 with an exhaust gas aftertreatment assembly.

The air intake passage 14 comprises an air filter 18 to filter air draw from the outside into the engine, a mass air flow sensor 20, a turbocharger 22 an intercooler 24 and a throttle valve 26 connected upstream to intake manifold 12a.

Exhaust system 16 comprises the turbine 28 of turbocharger 22, connected downstream to the exhaust manifold 12b of the engine, a three-way catalyst device 30, a diesel particulate filter 32 and an SCR device 34 arranged upstream of tailpipe 35. SCR device 34 includes a urea or ammonia injector 36, a decomposition (in case of urea injection) and/or mixing chamber 38, an SCR catalyst 40 connected downstream to the decomposition and/or mixing chamber 38 as well as an $NH_3$ and/or $NO_x$ sensor 41, which senses $NH_3$ and/or $NO_x$ downstream of the SCR catalyst in order to provide a feedback signal for the control of the urea or ammonia injector 36.

Three-way catalyst device 30 is arranged in close-coupled position with respect to the engine block 12. It oxidizes CO and incompletely burnt hydrocarbons (HC) contained in the exhaust gas emitted at the exhaust manifold 12b to $CO_2$ and $H_2O+CO_2$, respectively. Three-way catalyst device 30 is further equipped for reducing of $NO_x$ to $N_2$ and $O_2$. Nevertheless, when the diesel engine 12 operates in lean conditions, excess oxygen in the exhaust gas put the reduction of $NO_x$ at a disadvantage with respect to the oxidation reactions.

SCR device 34 eliminates $NO_x$ that pass through the three-way catalyst by injecting gaseous or liquid reductant (ammonia or urea) into the exhaust gas stream and reducing the $NO_x$ in the presence of a catalyst to form water vapour and nitrogen gas. SCR device 34 is typically arranged underfloor, downstream of the particulate filter outlet, as it requires some space to accommodate the urea or ammonia injector 36, the decomposition and/or mixing chamber 38 and the SCR catalyst 40. As mentioned hereinabove, the SCR device 34 needs operating in a high-temperature window (normally above 220 C). To avoid release of unreacted ammonia into the atmosphere (so-called ammonia slip), which may e.g. occur when catalyst temperatures are not in the optimal range for the reaction or when too much urea/ammonia is injected into the decomposition and/or mixing chamber 38, the SCR catalyst 40 may be equipped with an additional oxidation catalyst (slip catalyst).

The exhaust system 16 of FIG. 1 is equipped with several sensors for detecting the relevant exhaust gas parameters. A first temperature sensor 48 measures exhaust gas temperature at the outlet of the turbocharger turbine 28. A second temperature sensor 50 measures the temperature at the outlet of the three-way catalyst device 30. A third temperature sensor 52 measures the temperature in the decomposition and/or mixing chamber 38, i.e. shortly upstream of the SCR catalyst 40.

The engine 10 is further equipped with an exhaust gas recirculation (EGR) device 42, comprising an EGR valve 44 and an EGR cooler 46. As diesel engines normally operate with excess air, they can operate with very high EGR rates, especially at low loads, where there is otherwise a very large amount of excess air. EGR works by recirculating a portion of the exhaust gas back into the combustion chambers of engine block 12. Intermixing the incoming air with recirculated exhaust gas dilutes the mix with inert gas, which lowers the adiabatic flame temperature and reduces the amount of excess oxygen. The exhaust gas also increases the specific heat capacity of the mix, which, in turn, lowers the peak combustion temperature. Because $NO_x$ formation progresses much faster at high temperatures, EGR serves to limit the generation of $NO_x$.

The engine includes an engine control unit 47, such as e.g. a microprocessor, an application-specific integrated circuit, a field-programmable gate array or equivalents thereof, which controls operation of the different components of engine 10, in particular the fuel injectors (not shown), the throttle valve 26, the EGR device 42, and the SCR device 34. The engine control unit 47 is connected to various sensors, e.g. the mass air flow sensor 20, temperature sensors 48, 50, 52 and NH3 and/or NOx sensor 41. Not all of the sensors that the engine control unit 47 may be connected to are shown.

The engine control unit 47 monitors the temperature of the SCR device 34 that is measured by temperature sensor 52. It controls the engine in such a way that the engine changes over from an operation with a lean air/fuel mixture to an operation with a stoichiometric or a rich air/fuel mixture when the temperature of the SCR device drops below a predetermined temperature threshold (e.g. 200° C.) and when the engine control unit 47 detects that the $NO_x$ emissions would rise above a certain threshold (e.g. a legal limit) if the engine continued to operate in lean combustion mode. When the SCR temperature rises above the temperature threshold, the engine control unit 47 may revert to a lean air/fuel mixture (if demanded torque and load on the engine so permit). The engine control unit 47 is also configured to control the engine to operate with a stoichiometric or a rich air/fuel mixture during a warm-up phase of the SCR device, e.g. after a cold start. The engine control unit also controls the SCR device 34 so as to remain passive (i.e. so as not to inject ammonia or urea) as long as the temperature in the decomposition and/or mixing chamber 38 and/or SCR catalyst 40 lies outside a specified range.

In order to control the air/fuel mixture in the combustion chambers, the engine control unit preferably controls the fresh intake airflow by controlling the EGR rate via the EGR valve 44 instead of the intake throttle valve, because this produces minimal pressure difference between the exhaust port and the intake port of the engine and thus minimizes pumping losses and hence reduces the $CO_2$ penalty.

When it is desired to run the engine at a given air/fuel ratio ($\lambda$), the engine control unit 47 calculates the EGR rate using its engine management software such that there remains just enough fresh air for the engine to produce the torque requested by the driver at the desired $\lambda$. The amount of fuel to be injected can then be controlled to achieve the target air/fuel ratio based upon the available air.

However, it should be noted that other methods might be used to control the air flow rate in the engine, such as variable valve timing, throttling valves in the intake and/or the exhaust or variable pressure turbochargers or superchargers. A combination of such methods may be used to control the intake air flow rate.

In the embodiment of the invention illustrated in FIG. 1, the EGR process is of the so-called high-pressure type, i.e. the exhaust gases are removed from the exhaust upstream of the turbocharger turbine 28 and returned to the intake downstream of the compressor. As an alternative, the EGR process could be implemented as the low-pressure type, wherein the exhaust gases are removed from the exhaust downstream of the particulate filter 32 (or at least downstream of the turbocharger turbine 28) and returned upstream of the compressor of the turbocharger. In such low-pressure EGR systems, a throttle valve is typically provided in the exhaust downstream of the EGR take off to encourage the exhaust gases to flow into the EGR bypass passage. That throttle valve may be controlled to further control the available air in the combustion chamber.

Whereas the embodiment of FIG. 1 relies on temperature sensor 52 to measure the temperature of the SCR catalyst 40 directly, other embodiments of the invention may rely on temperature measurements in the exhaust system farther away from the SCR device 34 or on simulations of the temperature evolution in the SCR device 34 without any direct temperature measurement in the engine or in the exhaust line.

For instance, temperature sensors 50 and 52 could be omitted. In such case, the engine control unit 47 or a separate temperature estimator 49 may compute the temperature of the SCR device 34 using the temperature measurements from the first temperature sensor 48 as an input parameter of a mathematical model describing the thermal conduction properties of the exhaust system. The used model preferably takes into account the thermal capacity of the materials of the exhaust line, the mass flow rate of the exhaust gas, the outside temperature, etc. The advantage of such an embodiment is that the number of temperature sensors is less than in the embodiment of FIG. 1.

If all the temperature sensors shown in FIG. 1 are omitted, the engine control unit 47 may still be able to monitor the SCR temperature by using engine parameters, in particular the quantity of injected fuel, mass air flow, EGR rate, engine efficiency etc. as input parameters of a mathematical model providing the evolution of the temperature of the SCR device as a function of the engine parameters. That mathematical model basically determines the amount of energy provided to the engine (as fuel and air), the work done by the engine and the energy "lost" in form of heat. The model also determines the temperature at different locations along the exhaust line up to the SCR device 34, so that the engine control unit 47 is able to determine whether the SCR device 34 should be switched on or off.

Figure 2:
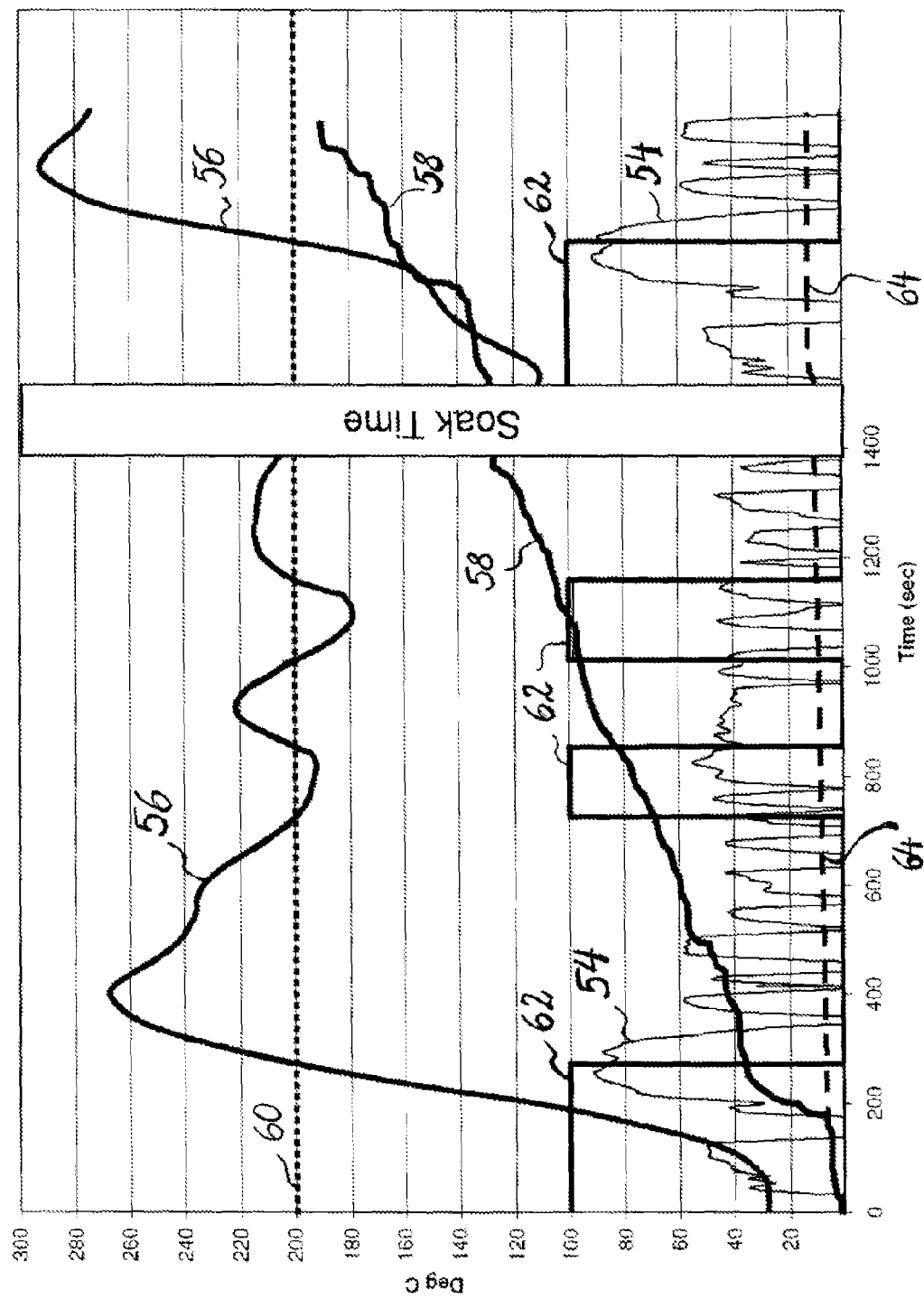
FIG. 2 is a chart illustrating the reduction of $NO_x$ emitted during FTP-75 test cycle and the temperature evolution of an SCR catalyst.

As will be appreciated, the engine according to the present invention has the advantage that it emits less $NO_x$ into the atmosphere than most conventional engines. FIG. 2 illustrates the evolution in time of certain engine parameters during an FTP-75 test cycle. The FTP-75 cycle comprises the following segments:
cold start phase (0-505 s),
transient phase (505-1369 s), and
hot start phase (0-505 s).

There is a pause of about 10 minutes ("soak time") between the second and the third phase, which is, however, not shown to scale in FIG. 2. Curve 54 (scale not shown) represents the speed profile of the test cycle. Curve 56 indicates the temperature of the SCR catalyst 40. Curve 58 (scale not shown) corresponds to the integrated (accumulated) NOx emissions at the exhaust manifold, i.e. before any after-treatment of the exhaust gases. Curve 64 (same scale as curve 58, not shown) corresponds to the integrated tailpipe NOx emissions of an after-treatment system that uses a three-way catalyst device 30 and an SCR device 34, wherein the engine and the SCR device is controlled in accordance with the invention.

Curve 62 indicates the time intervals during which the engine control unit 47 permits engine operation at $\lambda=1$ if the $NO_x$ emissions would otherwise rise too much. In these time intervals, curve 62 is high; in the time interval in which the engine control unit only allows lean combustion, curve 62 is low. The time intervals during which the engine control unit 47 permits engine operation at $\lambda=1$ correspond to those time interval in which the temperature of the SCR catalyst lies below a certain threshold (here 200° C., indicated by curve 60). As conversion of $NO_x$ in the SCR device is relatively inefficient in these time intervals, the injector 36 is preferably switched off during these periods so that no urea or ammonia is injected. When the SCR temperature rises above the threshold, the injector 36 is switched on. One observes that after the three-way catalyst has reached its operating temperature (in which occurs shortly after the beginning of the FTP-75 cycle due to the close-coupled position of the three-way catalyst at the outlet of the turbocharger turbine 28), the curve 64 of the integrated tailpipe $NO_x$ emissions levels out (because the engine is operated at $\lambda=1$ at that time). The curve 64 then remains flat (i.e. the NOx emission rate stabilizes at a very low level) because $NO_x$ reduction is achieved via the three-way catalyst or in the SCR catalyst, wherever the reduction is more efficient at a given time. The tailpipe $NO_x$ emissions during the high-acceleration phases are considerably reduced in comparison to the conventional after-treatment system, by the use of the three-way catalytic converter 30. Due its close-coupled position, the three-way catalyst reaches its operating temperature significantly earlier than the underfloor SCR device. When the engine is cold or when the SCR temperature is or drops below the SCR temperature threshold (i.e. when curve 62 is high), the engine is controlled to operate with a stoichiometric air/fuel mixture ($\lambda=1$). The three-way catalyst thus achieves good $NO_x$ conversion especially in these phases. A significant reduction of $NO_x$ emissions is achievable in the FTP-75 test cycle through the use of the invention.

The three-way catalyst device 30 may optionally be of the type described in patent application EP 2 072 774 A1, i.e. comprising an upstream three-way catalyst device and a downstream catalyst device at least with oxidation function, wherein an air injection device is arranged between the upstream three-way catalyst device and the downstream catalyst device to make the exhaust gas entering the downstream catalyst device leaner and to favour the oxidation reactions therein.

The three-way catalyst device 30 and the diesel particulate filter are preferably integrated into the same building bock.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

LEGEND

10 Diesel compression-ignition engine
12 engine block
12a intake manifold
12b exhaust manifold 14 air intake passage
16 exhaust system
18 air filter
20 mass air flow sensor
22 turbocharger
24 intercooler
26 throttle valve
28 turbocharger turbine
30 three-way catalyst device
32 Diesel particulate filter
34 SCR device
36 urea or ammonia injector
38 decomposition and/or mixing chamber
40 SCR catalyst
41 $NH_3$ and/or $NO_x$ sensor
42 EGR device
44 EGR valve
46 EGR cooler
47 Engine control unit
48 first temperature sensor
50 second temperature sensor
52 third temperature sensor
54 speed
56 temperature of SCR catalyst
58 integrated $NO_x$ emissions at exhaust manifold
60 temperature threshold for efficient conversion of $NO_X$
62 time intervals during which the engine control unit permits engine operation with stoichiometric or rich air/fuel mixture
64 integrated tailpipe $NO_x$ emissions of after-treatment system according to preferred embodiment of the invention

The invention claimed is:

1. A compression-ignition engine comprising
an exhaust system with an exhaust gas after-treatment assembly, said after-treatment assembly comprising a three-way catalyst device and an SCR device, said three-way catalyst device being arranged upstream said SCR device in close-coupled position with respect to said engine; and
an engine control unit for controlling operation of said engine;
wherein said engine control unit is configured to monitor a temperature of said SCR device and to control said engine to change over from an operation with a lean air/fuel mixture to an operation with a stoichiometric or a rich air/fuel mixture when the temperature of said SCR device drops below a temperature threshold; and said engine control unit further being configured to temporarily prevent or delay the change over to the stoichiometric or rich air/fuel mixture if said engine control unit determines that engine-out $NO_x$ emissions will remain below a certain threshold even if the engine continues operating with a lean air/fuel mixture.

2. The compression-ignition engine as claimed in claim 1, wherein said three-way catalyst device comprises a diesel particulate filter.

3. The compression-ignition engine (10) as claimed in claim 1, wherein said SCR device comprises a reductant injector, an SCR catalyst and a mixing zone located between said reductant injector and said SCR catalyst for allowing injected reductant to mix with exhaust gas.

4. The compression-ignition engine as claimed in claim 1, wherein said SCR device comprises a slip catalyst to prevent release of ammonia.

5. The compression-ignition engine as claimed in claim 1, wherein said SCR device is arranged in an underfloor position.

6. The compression-ignition engine as claimed in claim 1, wherein said engine control unit is also configured to control said engine to operate with a stoichiometric or a rich air/fuel mixture during a warm-up phase of said SCR device after a cold start.

7. The compression-ignition engine as claimed in claim 1, wherein said exhaust system comprises a temperature sensor operatively coupled with said engine control unit.

8. The compression-ignition engine as claimed in claim 7, wherein said temperature sensor is arranged in a mixing zone or an SCR catalyst of said SCR device.

9. The compression-ignition engine as claimed in claim 7, wherein said temperature sensor is located in said exhaust system upstream or downstream said SCR catalyst, wherein said engine control unit is configured to compute the temperature to be monitored of said SCR device using temperature measurements from said temperature sensor as input parameters of a mathematical model describing thermal conduction properties of said exhaust system.

10. The compression-ignition engine as claimed in claim 1, wherein said engine control unit is configured to compute the temperature to be monitored of said SCR device using engine parameters as input parameters of a mathematical model simulating an evolution of the temperature of the SCR device as a function of said engine parameters.

11. The compression-ignition engine as claimed in claim 1, wherein said engine control unit is configured to control operation of said SCR device (34) depending on said temperature of said SCR device.

12. The compression-ignition engine as claimed in claim 1, comprising an exhaust gas recirculation device operatively coupled to said engine control unit, said engine control unit being configured to control said exhaust gas recirculation device to achieve said stoichiometric or rich air/fuel mixture.

13. Method of operating a compression-ignition engine comprising an exhaust system with an exhaust gas after-treatment assembly, said after-treatment assembly comprising a three-way catalyst device and an SCR device, said three-way catalyst device being arranged upstream said SCR device in close-coupled position with respect to said engine; said method comprising monitoring a temperature of said SCR device (34) and controlling said engine in such a way as to change over from an operation with a lean air/fuel mixture to an operation with a stoichiometric or a rich air/fuel mixture when the temperature of said SCR device drops below a temperature threshold, wherein the change over to the stoichiometric or rich air/fuel mixture is temporarily prevented or delayed if it is determined that engine-out $NO_x$ emissions will remain below a certain threshold even if the engine continues operating with a lean air/fuel mixture.

14. The method as claimed in claim 13, wherein said compression-ignition engine comprises an exhaust gas recirculation device, and wherein said method comprises controlling said exhaust gas recirculation device in such a way as to achieve said stoichiometric or rich air/fuel mixture.

* * * * *